(12) United States Patent
Wada

(10) Patent No.: US 6,649,014 B1
(45) Date of Patent: Nov. 18, 2003

(54) PROCESS FOR PRODUCING IC CARD

(75) Inventor: Satoharu Wada, Hyogo-ken (JP)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/831,719

(22) PCT Filed: Nov. 4, 1999

(86) PCT No.: PCT/EP99/08414

§ 371 (c)(1),
(2), (4) Date: May 14, 2001

(87) PCT Pub. No.: WO00/30031

PCT Pub. Date: May 25, 2000

(30) Foreign Application Priority Data

Nov. 13, 1998 (JP) .......................................... 10-323473

(51) Int. Cl.[7] .......................... B32B 31/20; B29C 65/02; C09J 5/06; G06F 17/60
(52) U.S. Cl. ................. 156/286; 156/307.7; 156/331.4; 156/331.7; 705/41
(58) Field of Search ................................ 156/104, 285, 156/286, 382, 307.7, 331.4, 331.7; 705/41

(56) References Cited

U.S. PATENT DOCUMENTS

| | | | |
|---|---|---|---|
| 4,450,024 A | 5/1984 | Haghiri-Tehrani et al. | .. 156/108 |
| 5,134,773 A | 8/1992 | LeMaire et al. | ............... 29/827 |
| 5,690,773 A | 11/1997 | Fidalgo et al. | ............... 156/267 |
| 6,320,115 B1 * | 11/2001 | Kataoka et al. | ............. 136/251 |

FOREIGN PATENT DOCUMENTS

| | | | | |
|---|---|---|---|---|
| GB | 2279610 | 1/1995 | | |
| JP | 04 248353 | 9/1992 | | |
| JP | 05 270173 | 10/1993 | | |
| JP | 05-270173 | * 10/1993 | ........... B42D/15/10 | |
| JP | 90300868 | 11/1997 | | |
| JP | 11 340934 | 12/1999 | | |

OTHER PUBLICATIONS

Abstract, JP05270173, Oct. 19, 1993.
Abstract, JP04238353, Sep. 3, 1992 (JP4000/1991).
Abstract, JP10147087.
Abstract, JP300868/1997.
Abstract, JP11340934, Dec. 10, 1999.

* cited by examiner

*Primary Examiner*—Curtis Mayes
*Assistant Examiner*—Sing P. Chan
(74) *Attorney, Agent, or Firm*—Stephen D. Harper; Daniel S. Ortiz

(57) ABSTRACT

A process for producing an IC card is provided wherein an interlayer sheet carrying an IC module is contact bonded under reduced pressure to a top sheet and a base sheet using a reactive polyurethane hot melt adhesive.

17 Claims, 1 Drawing Sheet

PROCESS FOR PRODUCING IC CARD

TECHNICAL FIELD OF THE INVENTION

The present invention relates to a novel process for producing IC card.

DISCUSSION OF THE RELATED ART

As the process for producing IC card, the following methods are heretofore known:
(a) a heat laminate molding method, (b) a resin filling method, (c) an injection molding method, and
(d) an adhesion method with a hot melt resin. However, these methods have the following drawbacks.

The method (a) has a problem that a production process is complicated, and production cost increases because the recesses must be formed on the resinous base in compliance with the various shapes of individual IC module which is embedded in said recesses (see, for example, Japanese Patent Publications (KOKAI) No. 109693/1987 and No. 300868/1997).

The method (b) has not only a drawback that at least one side of the card must be transparent (UV curable resins) or setting time is so long that a workability is low (thermoset resins) but also a problem that an additional process is necessary in order to arrange a spacer.

The method (c) has a problem that not only a production efficiency is low as two injection processes are necessary but also a yield of the card is low because of the breakdown of IC module and a crook of the card caused by high temperature and pressure at the time of injection molding (see, for example, Japanese Patent Publication (KOKAI) No. 24000/1991).

The method (d) has not only a drawback that hot melt resins having high softening temperature cannot be applied to plastic base materials having low heat resistance or hot melt resins having low softening temperature lower a heat resistance of the card but also a problem that when the laminate sheet consisting of a top sheet, a base sheet, and an interlayer sheet carrying IC module which is lain between the top sheet and the base sheet is subjected to a contact bonding process with reactive curing hot melt resins under normal pressure, a quality of the IC card is lowered owing to blisters formed within the laminate sheet, said blisters being attributable to a concentration of carbon dioxide produced during the reaction in air bubbles within the laminate sheet. For example, appearance and printability (surface smoothness) are deteriorated owing to the concave and convex parts formed on the surface of the IC card, and strength, heat resistance, chemical resistance, water resistance and the like are lowered owing to the deterioration of gastightness of the IC card (see, for example, Japanese Patent Publications(KOKAI) No.270173/1993 and No. 147087/1998).

SUMMARY OF THE INVENTION

The present invention has been carried out to provide inexpensively IC card having high commodity value and great expectations of various uses by solving the aforesaid problems concerning the former methods of producing the IC card.

The present invention relates to a process for producing IC card consisting of a top sheet, a base sheet, and an interlayer sheet carrying IC module, said interlayer sheet being lain between said top sheet and base sheet, and said IC module being laid on or embedded in said interlayer sheet, characterized in that said top, base and interlayer sheets are subjected to a contact bonding process with a reactive polyurethane hot melt resin under reduced pressure.

DETAILED DESCRIPTION OF THE INVENTION

The embodiments of the present invention will now be described with reference made to the accompanying drawings, in which.

Figure 1:
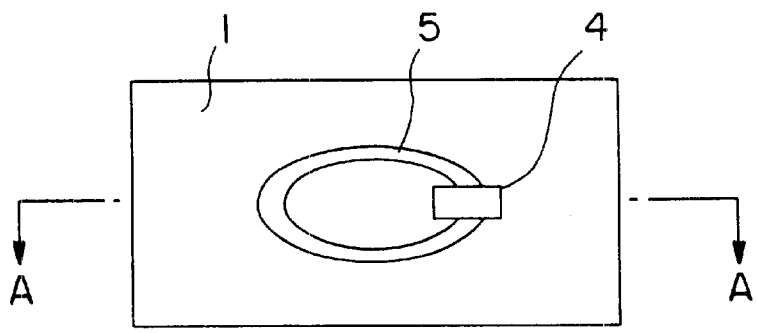
FIG. 1 is a schematic plan of an embodiment of non-contact type IC card according to the present invention.

The top sheet 1 and the base sheet 2 may be of various plastics, papers or synthetic papers having printability and suitable strength, metals, ceramics or the like. Following polymers are exemplified as the plastics: polyester, ABS, PET, PET-G(polyethylene terephthalate-glycol), polyolefins such as polyethylene, polypropylene and the like, polycarbonate, methyl polymethacrylate, polystyrene, polycaprolactam, polyvinyl alcohol, polyvinyl chloride and the like. These materials may suitably be used together.

The thickness of the top sheet 1 or the base sheet 2 may suitably be chosen in accordance with kinds of the materials, shapes and sizes of IC module, uses of IC card and the like, and therefore it is indefinite. Usually said thickness is 50–300 micron, particularly 70–280 micron.

The interlayer sheet 3 may be of the aforesaid various plastics, papers or synthetic papers as well as various nonwoven and the like. The materials may suitably be used together.

Thickness of the interlayer sheet 3 is also indefinite. Usually said thickness is 100–550 micron, particularly 100–500 micron.

Back surface of the top sheet 1, top surface of the base sheet 2 or top and back surfaces of the interlayer sheet 3 may be subjected to a pretreatment such as coating of a primer resin (e.g. urethane resins and the like ),corona discharge treatment or plasma treatment in order to increase an adhesivity with the reactive polyurethane hot melt resin 6.

The IC modules which have commonly been used for IC card, such as the module shown in the accompanying drawings in which the end of the coil for transmission and reception 5 is bonded to the terminal of IC chip 4 by soldering may suitably be used as the IC module which is laid on (see FIG. 2) or embedded in (see FIG. 3) the interlayer sheet 3.

As the adhesive to adhere mutually aforementioned top sheet 1, base sheet 2, and interlayer sheet 3, the reactive polyurethane hot melt resin is employed, said hot melt resin comprising an isocyanato end group containing prepolymer which can be crosslinked and cured by moisture in air or the like, and various additives such as thermoplastics (e.g. olefin resins and the like), tackifier (e.g. phenolic resins and the like), plasticizer (e.g. dimethyl phthalate and the like), antioxidant (e.g. phenolic antioxidant and the like), catalyst (e.g. dibutyltin dilaurate and the like) and the like.

The top sheet 1, the base sheet 2, and the interlayer sheet 3 carrying aforesaid IC module are subjected to the contact bonding process with the reactive polyurethane hot melt resin 6 under reduced pressure.

Usually a thickness of the adhesive is 5–600 micron. The contact bonding process may be carried out in such a condition that the adhesive is melted by heating or the adhesive maintains its adhesive porperty. Usually the temperature of the adhesive in such state is room temperature −150° C. Although a degree of the reduced pressure is indefinite, it is usually less than 20 mmHg, preferably 1–10 mmHg. Usually the applied pressure is 0–30 Kgf/cm$^2$, preferably 0–15 Kgf/cm$^2$. The time of the contact bopnding process under these conditions is usually 1–120 sec, preferably 1–60 sec. The problem that carbon dioxide produced during the reaction concentrates in air bubbles within the laminate sheet and blisters the laminate sheet can be solved by carrying out aforesaid contact bonding process.

The laminate sheet produced as described above may, if necessary, be compressed at, for example, 0–20 Kgf/cm$^2$ for few minutes at ambient temperature or forced cold temperature under normal pressure, and then left for few hours at ambient temperature to obtain IC card according to the present invention.

The aforementioned IC card may be produced one by one. However, it is effective to produce a large laminate body whose size is several times as large as a unit IC card, and then cut into the unit IC card, said large laminate body consisting of the top, base and interlayer sheets having said large area and corresponding numbers of IC modules.

EXAMPLE

The present invention will now be illustrated by the following example.

Example 1

Figure 2:
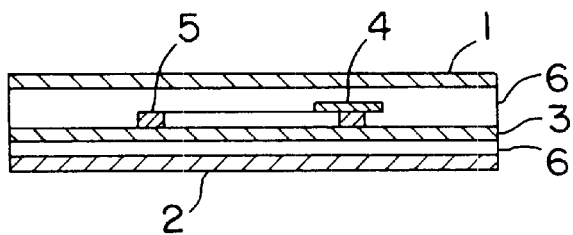
FIG. 2 is an embodiment of a schematic sectional view through A—A line in FIG. 1.
Figure 3:
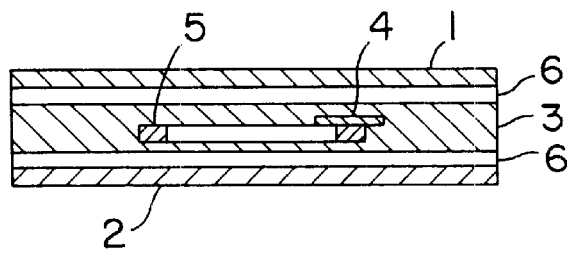
FIG. 3 is another embodiment of a schematic sectional view through A—A line in FIG. 1.

The undermentioned top sheet, base sheet, interlayer sheet, IC module, and reactive polyurethane hot melt resin were laminated as shown in FIG. 2, and the resultant laminate body was subjected to the contact bonding process at 15 Kgf/cm$^2$ for 60 sec at 90° C. under reduced pressure of 10 mmHg in the vacuum-pressure type laminator. The laminate body was compressed at 10 Kgf/cm$^2$ for 20 minutes at room temperature, and then left for 24 hours at room temperature. The obtained laminate body was cut into 16 unit IC cards (86 mm ?54 mm). Blistrers were not observed on the IC cards.

Top sheet: PET film (300 mm×400 mm×0.188 mm)

Base sheet: PET film (300 mm×400 mm×0.188 mm)

Interlayer sheet:PET film (300 mm×400 mm×0.188 mm)

IC module:elliptic band-coil for transmission and reception (major axis; 70 mm, minor axis; 40 mm, width; 3 mm, thickness; 0.03 mm), IC chip (10 mm×8 mm×0.3 mm)

Hot melt resin: "Macroplast QR 9000" (Henkel Co.),

Thickness: 0.196 mm

Comparative Example 1

The laminate body was produced by the same manner as that described in Example 1 except that the contact bonding process was carried out under normal pressure. After 24 hours the scattered blisters were observed on the resultant laminate body.

EFFECT OF THE INVENTION

According to the present invention, IC card having high commodity value and great expectations of various uses can inexpensively be provided by solving the various problems concerning the former methods of producing IC card.

What is claimed is:

1. A process for producing an IC card comprising a top sheet, a base sheet, and an interlayer sheet which carries an IC module, said interlayer sheet being positioned between said top sheet and said base sheet and said IC module being laid on or embedded in said interlayer sheet, said process comprising a step of subjecting said top sheet, said base sheet and said interlayer sheet to a contact bonding with a moisture reactive polyurethane hot melt resin under a reduced pressure, and curing said moisture reactive polyurethane hot melt resin by exposing to moisture in air at normal pressure.

2. The process of claim 1 wherein said contact bonding is carried out at a temperature from room temperature to 150° C.

3. The process of claim 1 wherein said contact bonding is carried out at 0 to 30 Kgf/cm$^2$.

4. The process of claim 1 wherein said reduced pressure is less than 20 mm Hg.

5. The process of claim 1 wherein said top sheet is comprised of a plastic.

6. The process of claim 1 wherein said base sheet is comprised of a plastic.

7. The process of claim 1 wherein said top sheet or said base sheet has a thickness of from 50 to 300 microns.

8. The process of claim 1 wherein said contact bonding is performed for a time of from 1 to 120 seconds.

9. The process of claim 1 wherein said reactive polyurethane hot melt resin is comprised of an isocyanate end group containing prepolymer capable of being crosslinked and cured by moisture.

10. The process of claim 9 wherein said reactive polyurethane hot melt adhesive is additionally comprised of at least one additive selected from the group consisting of thermoplastics, tackifers, plasticizers, antioxidants and catalysts.

11. The process of claim 1 wherein the reactive polyurethane hot melt adhesive is in a layer having a thickness of 5 to 600 microns.

12. An IC card produced by the process of claim 1.

13. A process for producing an IC card comprising a top sheet having a thickness of from 50 to 300 microns, a base sheet having a thickness of from 50 to 300 microns and an interlayer sheet, which has a thickness of from 100 to 550 microns and which carries an IC module, said interlayer sheet being positioned between said top sheet and said base sheet and said IC module being laid on or embedded in said interlayer sheet, said process comprising a step of subjecting said top sheet, said base sheet and said interlayer sheet to contact bonding with a moisture reactive polyurethane hot melt adhesive under a reduced pressure of less than 20 mm Hg at a temperature of from room temperature to 150° C., and curing said moisture reactive polyurethane hot melt adhesive by exposing to moisture in air at normal pressure.

14. The process of claim 13 wherein said reduced pressure is from 1 to 10 mm Hg.

15. The process of claim 13 wherein said contact bonding is performed using an applied pressure of from 0 to 15 Kgf/cm$^2$.

16. The process of claim 13 wherein at least one of the top sheet, base sheet, or interlayer sheet is comprised of a plastic selected from the group consisting of polyesters, ABS, PET, PET-G, polyolefins, polycarbonates, methyl polymethacrylates, polystyrenes, polycaprolactones, polyvinyl alcohols, and polyvinyl chlorides.

17. The process of claim 13 wherein said reactive polyurethane forms a first layer having a thickness of 5 to 600 microns positioned between said top sheet and said interlayer sheet and a second layer having a thickness of 5 to 600 microns between said interlayer sheet and said base sheet.

* * * * *